UNITED STATES PATENT OFFICE.

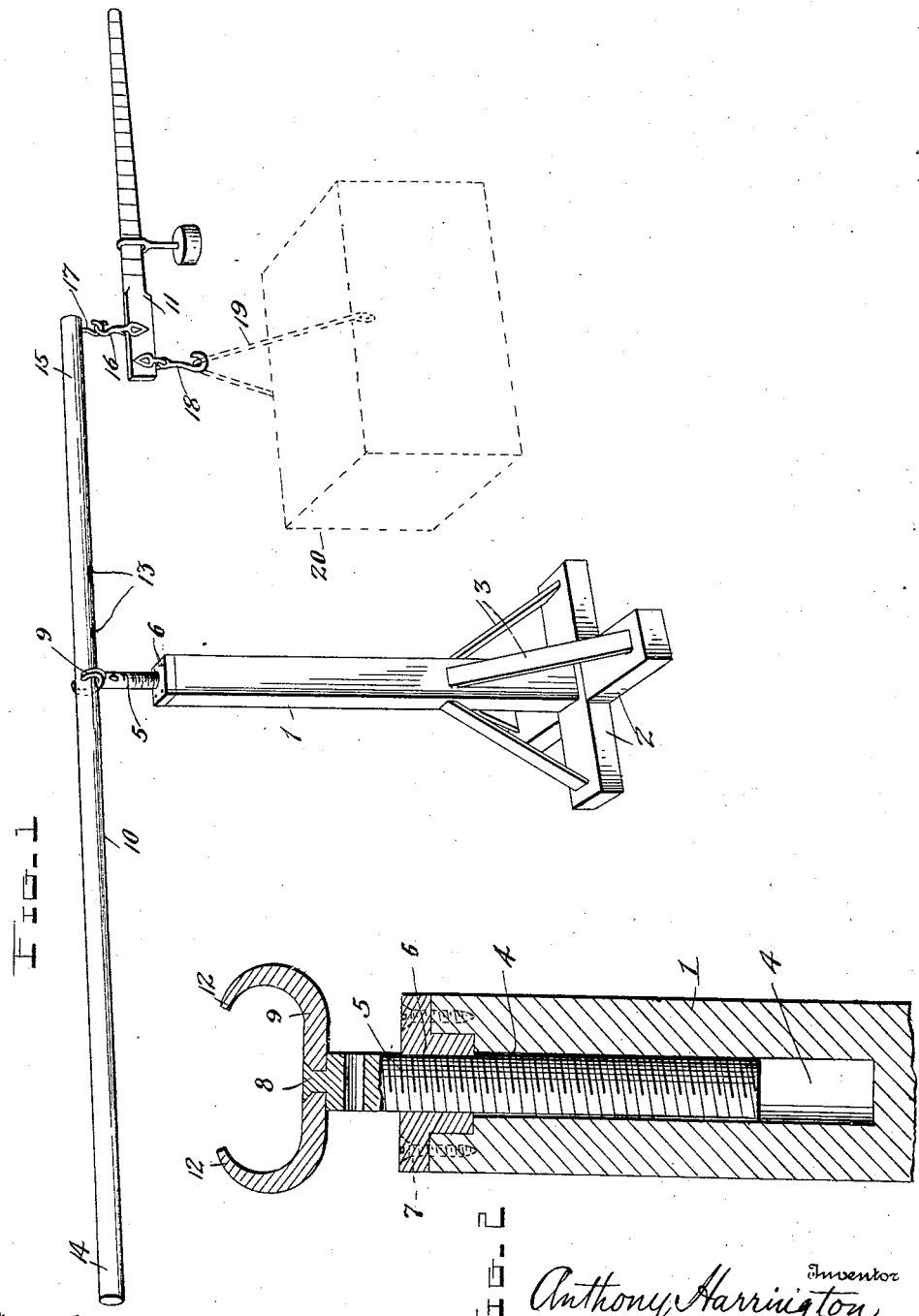

ANTHONY HARRINGTON, OF CUSTER, KENTUCKY.

WEIGHING APPARATUS.

No. 855,887.      Specification of Letters Patent.      Patented June 4, 1907.

Application filed February 11, 1907. Serial No. 356,793.

*To all whom it may concern:*

Be it known that I, ANTHONY HARRINGTON, a citizen of the United States, residing at Custer, in the county of Breckinridge and State of Kentucky, have invented certain new and useful Improvements in Weighing Apparatus, of which the following is a specification, reference being had therein to the accompanying drawing.

My invention relates to improvements in weighing apparatus and more particularly to a portable supporting device for a balance or steelyard.

The object of the invention is to provide a device of this character which may be conveniently moved from place to place on a farm or in a barn or other building, and readily set up for supporting a balance or steelyard upon which live stock, hogsheads and the like may be weighed.

With the above and other objects in view, the invention consists of the novel construction, combination and arrangement of parts hereinafter described and claimed and illustrated in the accompanying drawings, in which Figure 1 is a perspective view illustrating the application of my invention; and Fig. 2 is a detail vertical section through the upper end of the adjustable upright or post.

My improved balance or steelyard supporting device comprises an upright or post 1 mounted centrally upon a base 2 consisting of two beams arranged at right angles and mortised into each other. The post 1 is strengthened by inclined braces 3 arranged between its sides and the outer portions of the crossed beams 2. In the upper end of the post 1 is a socket 4 adapted to receive a screw 5 which passes through a nut 6 arranged upon the top of the post and in the form of a plate secured by screws or similar fastenings 7. The projecting upper end of the screw 5 has a reduced pivot stud 8 upon which is mounted for rotary movement a fulcrum bar 9. The latter is adapted to support a sweep 10 which has the balance or steelyard 11 detachably connected to one of its ends. In order to retain the sweep upon the fulcrum bar or cross piece 9, the opposite ends of the latter are curved upwardly and inwardly to provide the stop arms 12, as clearly shown in Fig. 2. This construction prevents the sweep from slipping laterally off of the fulcrum screw or post, and the sweep may be prevented from slipping longitudinally by forming in it notches or seats 13, as shown in Fig. 1. The sweep 10 may be in the form of a pole or beam of any description and it is of such length that its outer end 14 may be readily raised and lowered by one or more persons for the purpose of raising and lowering the steelyard 11 and the object which is to be weighed.

The steelyard shown in Fig. 1 is of well known form and it is removably or detachably connected to the inner end 15 of the sweep by engaging its fulcrum hook 16 with a hook or eye 17 upon said inner end of the sweep. The object or objects to be weighed are suitably hung upon the hook 18 of the steelyard, and in Fig. 1 I have shown said hook in engagement with the bail 19 of a box or similar receptacle 20 adapted to receive a pig, a sheep or other head of live stock to be weighed.

The construction, use and advantages of the invention will be readily understood. When the device is set up for use, as shown in Fig. 1, the end 15 of the sweep may be lowered to enable the hook 18 of the steelyard to be engaged with the object to be weighed. The handle end 14 of the sweep is then lowered so that its opposite end 15 will be raised and will lift the steelyard and the box 20 off of the ground. The weight of the box 20 may then be ascertained by adjusting the weight or weights upon the long arm of the steelyard. It will be seen that the post 1 may be set up for use at any place and that it may be conveniently carried together with the sweep 10 and the steelyard, in a wagon or on a sled. The device may thus be readily transported from place to place over the farm for weighing live stock, timber, farm products or the like. It will also be noted that the device may be effectively used for loading boxes, hogsheads or the like upon a wagon. It will be seen that after the box or other object has been weighed, the end 14 of the sweep may be lowered to a greater extent so that said box may be swung over and into a wagon or the like. The swivel connection between the fulcrum bar 9 and the screw 5 permits the sweep 10 to be swung angularly, and the provision of the screw stud or post 5 in the upright 1 permits the fulcrum bar 9 to be raised and lowered as may be found convenient or necessary.

Having thus described my invention what

I claim and desire to secure by Letters Patent is:

1. A support for a sweep comprising an upright, a nut thereon, a vertically extending screw in said nut, and a fulcrum piece upon said screw.

2. A support for a sweep comprising an upright, a nut thereon, a vertically extending screw in said nut, and a fulcrum cross bar swiveled upon the upper end of said screw.

3. A portable support for a sweep comprising an upright, a base at the lower end of the latter, a nut upon the upper end of said upright, a vertically extending screw in said nut and a fulcrum cross bar upon the upper end of said screw and having at its ends upwardly projecting stop arms.

4. A portable support for a sweep comprising an upright having a socket in its upper end, a base at the lower end of said upright, a cap nut upon the upper end of said upright, a screw arranged in said nut and in the socket in said upright and a fulcrum cross bar pivoted upon the upper end of said screw and having its ends bent upwardly and inwardly, substantially as shown and described.

5. A device of the character described comprising a portable upright having a supporting base at its lower end, a screw vertically adjustable in the upper end of said upright, a fulcrum piece upon the upper end of said screw and a sweep detachably engaged with said fulcrum piece, said sweep having means at one end to support a steelyard or the like and also having intermediate its ends seats to engage said fulcrum piece, substantially as described.

In testimony whereof I hereunto affix my signature in presence of two witnesses.

ANTHONY HARRINGTON.

Witnesses:
JESSE B. RHODUS,
JAMES HARRINGTON.